United States Patent
Benjamin et al.

(10) Patent No.: US 11,991,057 B2
(45) Date of Patent: *May 21, 2024

(54) ILLICIT ROUTE VIEWING SYSTEM AND METHOD OF OPERATION

(71) Applicant: Level 3 Communications, LLC, Broomfield, CO (US)

(72) Inventors: Michael Benjamin, Broomfield, CO (US); Skyler J. Bingham, Superior, CO (US); John S. Reynolds, Westminster, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,150

(22) Filed: May 18, 2023

(65) Prior Publication Data
US 2023/0300043 A1 Sep. 21, 2023

Related U.S. Application Data

(63) Continuation of application No. 17/340,613, filed on Jun. 7, 2021, now Pat. No. 11,658,887, which is a
(Continued)

(51) Int. Cl.
*H04L 43/045* (2022.01)
*H04L 9/40* (2022.01)
(Continued)

(52) U.S. Cl.
CPC ............ *H04L 43/045* (2013.01); *H04L 41/12* (2013.01); *H04L 41/18* (2013.01); *H04L 41/22* (2013.01);
(Continued)

(58) Field of Classification Search
CPC ....... H04L 43/045; H04L 41/12; H04L 41/18; H04L 41/22; H04L 43/12; H04L 63/0227;
(Continued)

(56) References Cited

U.S. PATENT DOCUMENTS 6,304,262 B1 10/2001 Maloney
6,405,318 B1 6/2002 Rowland
(Continued)

FOREIGN PATENT DOCUMENTS

WO WO-2014052756 A 4/2014

OTHER PUBLICATIONS

Extended European Search Report, dated Aug. 29, 2018, Application No. 16780876.5, filed Apr. 15, 2016; 6 pgs.
(Continued)

*Primary Examiner* — El Hadji M Sall

(57) ABSTRACT

A route viewing system includes a computing system that receives information associated with one or more routes through a network, and identifies the routes that are associated with at least one illicit user computer used by an illicit user. The computing system then obtains a source location of a source address of the routes and a destination location of a destination address of the routes, and displays the routes on a geographical display at the source location of the source address and the destination location of the destination address of each of the routes.

20 Claims, 9 Drawing Sheets

Related U.S. Application Data continuation of application No. 16/435,249, filed on Jun. 7, 2019, now Pat. No. 11,038,780, which is a continuation of application No. 15/130,418, filed on Apr. 15, 2016, now Pat. No. 10,320,629.

(60) Provisional application No. 62/149,334, filed on Apr. 17, 2015.

(51) Int. Cl.
*H04L 41/12* (2022.01)
*H04L 41/18* (2022.01)
*H04L 41/22* (2022.01)
*H04L 41/28* (2022.01)
*H04L 43/12* (2022.01)

(52) U.S. Cl.
CPC .......... *H04L 43/12* (2013.01); *H04L 63/0227* (2013.01); *H04L 63/0236* (2013.01); *H04L 63/10* (2013.01); *H04L 63/101* (2013.01); *H04L 63/102* (2013.01); *H04L 63/107* (2013.01); *H04L 63/1425* (2013.01); *H04L 63/306* (2013.01); *H04L 41/28* (2013.01)

(58) Field of Classification Search
CPC ... H04L 63/0236; H04L 63/10; H04L 63/101; H04L 63/102; H04L 63/107; H04L 63/1425; H04L 63/306; H04L 41/28
See application file for complete search history.

(56) References Cited

U.S. PATENT DOCUMENTS

| | | |
|---|---|---|
| 6,772,349 B1 | 8/2004 | Martin et al. |
| 8,477,605 B2 | 7/2013 | Elliott et al. |
| 2001/0036183 A1 | 11/2001 | Melick et al. |
| 2003/0115319 A1 | 6/2003 | Dawson et al. |
| 2005/0201302 A1 | 9/2005 | Gaddis et al. |
| 2006/0069569 A1* | 3/2006 | Knott .................. H04M 3/4936 704/270 |
| 2006/0182034 A1 | 8/2006 | Klinker et al. |
| 2006/0206261 A1 | 9/2006 | Altaf et al. |
| 2007/0064697 A1 | 3/2007 | Nesbitt et al. |
| 2007/0201474 A1 | 8/2007 | Isobe |
| 2008/0049631 A1* | 2/2008 | Morrill .................. H04L 43/04 370/250 |
| 2008/0049927 A1* | 2/2008 | Wiley .................. H04L 47/2416 379/230 |
| 2008/0103689 A1* | 5/2008 | Graham ................ H04W 4/029 701/431 |
| 2011/0064085 A1 | 3/2011 | Westberg |
| 2013/0114612 A1 | 5/2013 | Singh |
| 2014/0006961 A1 | 1/2014 | Huliyar |
| 2014/0233585 A1 | 8/2014 | Beers et al. |
| 2014/0245395 A1 | 8/2014 | Hulse et al. |
| 2015/0100479 A1 | 4/2015 | Jorisch |
| 2015/0163224 A1 | 6/2015 | Kim |
| 2016/0308739 A1 | 10/2016 | Benjamin et al. |
| 2019/0288928 A1 | 9/2019 | Benjamin |
| 2021/0297458 A1 | 9/2021 | Benjamin |

OTHER PUBLICATIONS

International Preliminary Report on Patentability dated Oct. 17, 2017, Int'l Appl. No. PCT/US16/27843, Int'l Filing Date Apr. 15, 2016; 7 pgs.

International Search Report dated Jul. 26, 2016, Int'l Appl. No. PCT/US16/027843, Int'l Filing Date Apr. 15, 2016; 3 pgs.

Written Opinion of the International Searching Authority dated Jul. 26, 2016, Int'l Appl. No. PCT/US16/027843, Int'l Filing Date Apr. 15, 2016; 5 pgs.

\* cited by examiner

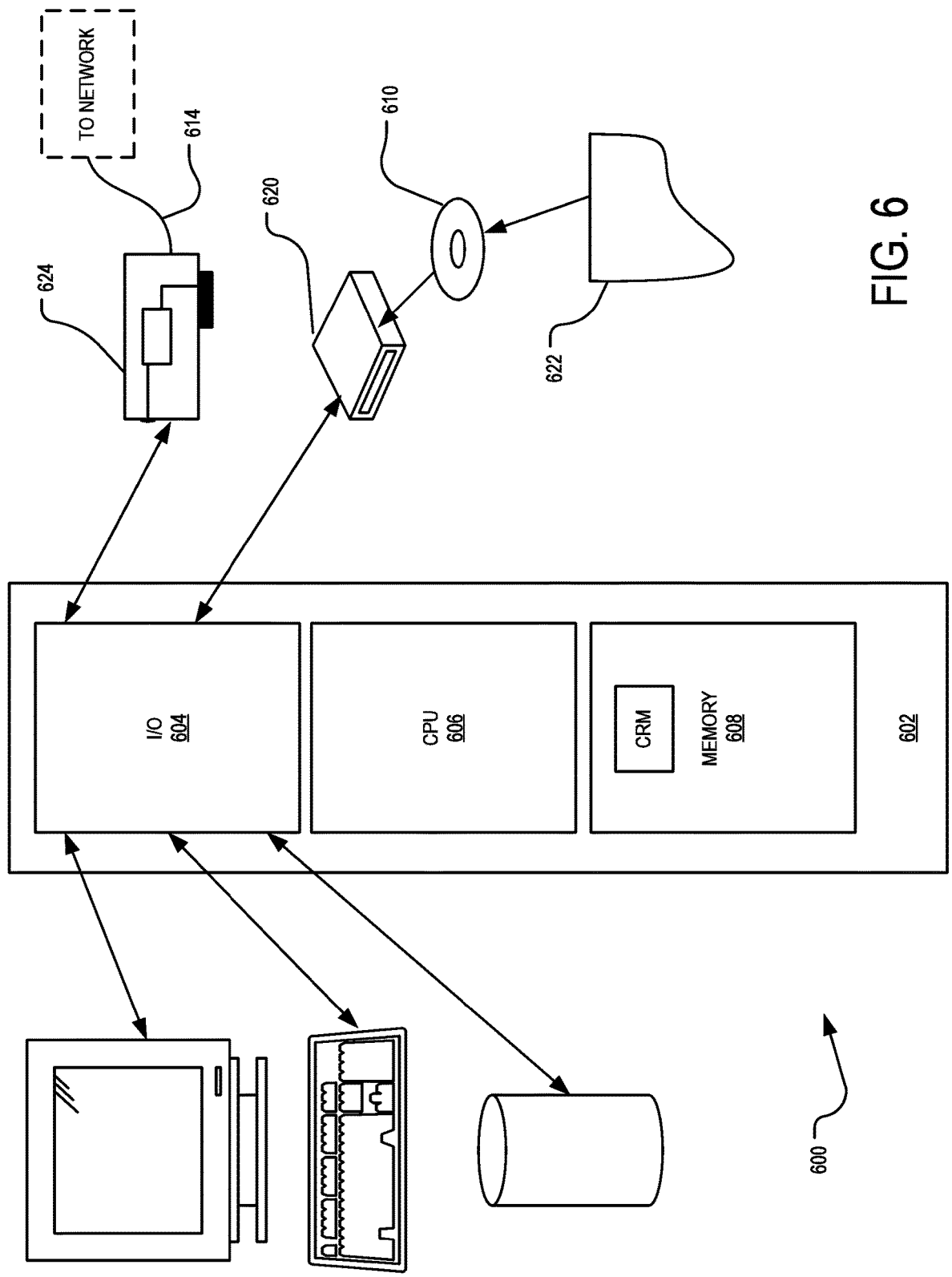

ILLICIT ROUTE VIEWING SYSTEM AND METHOD OF OPERATION

TECHNICAL FIELD

Aspects of the present disclosure generally relate to communication networks, and more particularly, to an illicit route viewing system and method of operation.

BACKGROUND

Publicly accessible networks, such as the Internet, are often fraught with malicious activity performed by individuals referred to as bad actors. As such, these publicly accessible networks are often monitored to detect and mitigate such behavior. Additionally, these publicly accessible networks may be monitored to perform surveillance on individuals who may communicate using these publicly accessible networks while performing what is deemed by some to constitute illicit activities that may be performed outside of the publicly accessible networks.

Monitoring or surveillance of publicly accessible networks often requires the accumulation and analysis of large amounts of data, which is often referred to as big data. In general, big data is a term that has been adopted to mean a data set that is too large or complex for processing by conventional data processing applications. Analysis of this big data often entails finding correlations or relationships among seemingly independent bits and pieces of information. These correlations or relationships may then be used to infer information that can be used to determine illicit activities performed by the illicit users.

SUMMARY

According to one embodiment, a route viewing system includes a computing system that receives information associated with one or more routes through a network, and identifies those routes that are associated with at least one illicit user computer used by an illicit user. The computing system then obtains a source location of a source address of the routes and a destination location of a destination address of the routes, and displays the routes on a geographical display at the source location of the source address and the destination location of the destination address of each of the routes.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

FIG. 6 illustrates an example of a computing system that may implement various systems and methods discussed herein.

DETAILED DESCRIPTION

Aspects of the present disclosure involve a system and a method for displaying illicit route information at geographical locations associated with the source address and/or destination address of illicit routes in a manner that may provide for analysis of attacks upon a communication network. While conventional communication network analysis tools may be used to find information associated with illicit activities, this information is often difficult to assess due to its large size such that finding real illicit activities often becomes akin to looking for a needle in a haystack. Embodiments of the present disclosure provide a solution to this problem by associating routes used by illicit users (e.g., bad actors) with a geographical location where the route is initiated and/or where it is terminated such that personnel may efficiently identify those routes that may indicate real illicit activity from those that may include extraneous information.

Figure 1A:
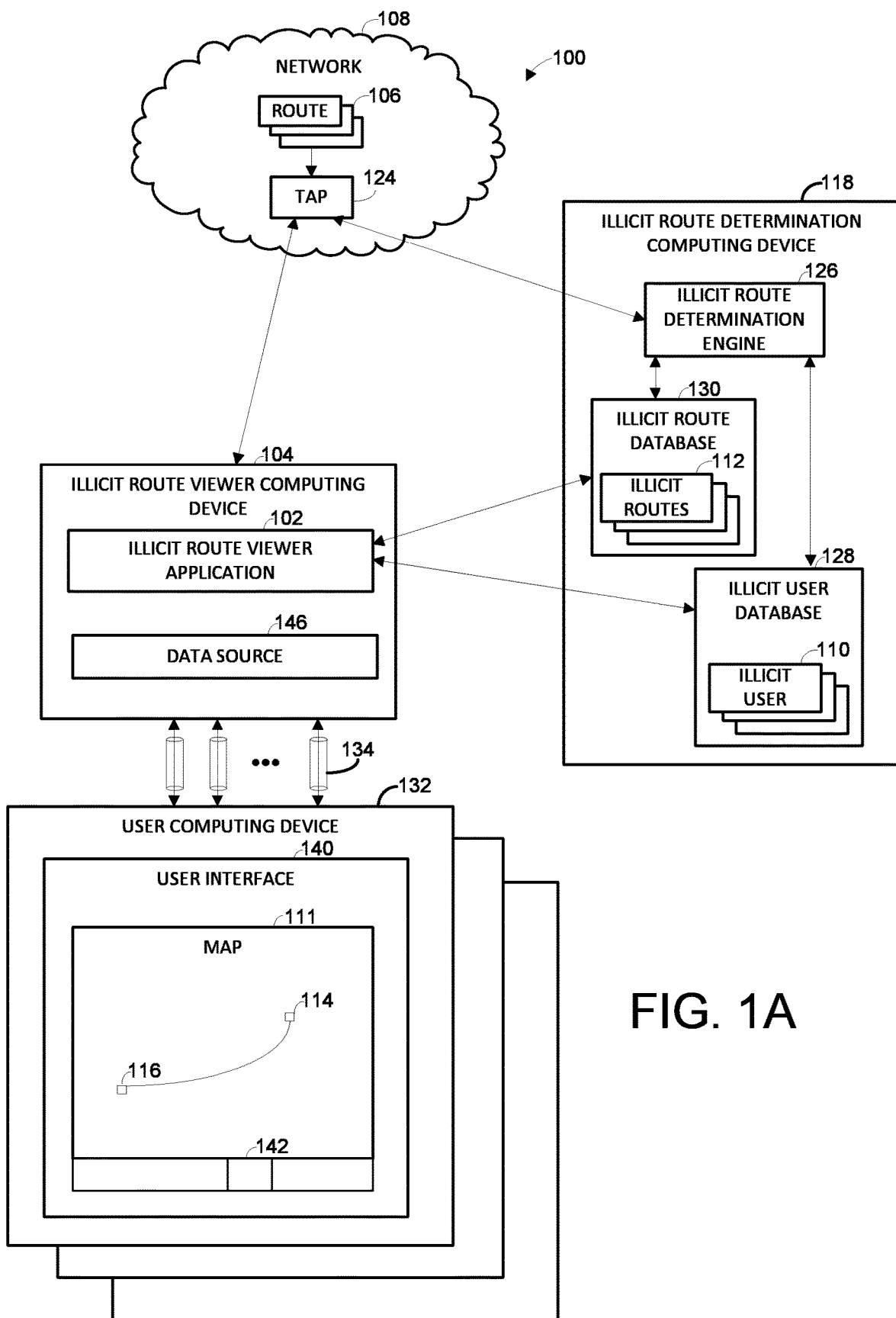
FIG. 1A illustrates an example illicit route viewing system according to the teachings of the present disclosure.

FIG. 1A illustrates an example illicit route viewing system 100 according to the teachings of the present disclosure. The illicit route viewing system 100 includes an illicit route viewer application 102 that is executed on an illicit route viewer computing device 104. The illicit route viewer application 102 receives route information associated with routes 106 in a network 108, identifies those routes 106 that are associated with at least one illicit user 110, filters the identified routes 106 according to one or more criteria, and displays the routes 106 on a map 111 at and between the locations of the source address 114 and destination address 116 of the routes 106.

In general, the illicit route viewer application 102 receives route information from the network 108, such as the Internet or other suitable communication network, and compares the received route information with at least one of information about illicit users 110 stored in an illicit user database 128 and/or information about known illicit routes 112 stored in an illicit route database 130 to identify those routes 106 that may be malicious. The application 102 then obtains a source location associated with a source address 116 of the illicit route and/or a destination location associated with a destination address 114 of the route 106, and displays the route 106 on a user interface (UI) 140 for view by a user.

Embodiments of the present disclosure may be particularly useful when used to view multiple illicit routes generated by a known illicit user 110. For example, an illicit user 110 may send multiple messages to separate destinations in which each message has a relatively low correlation to one another when analyzed independently; however, when viewed together, may provide a distinct correlation to some illicit activity. As another example, an illicit user 110 may employ the use of one or more remotely configured computing devices to relay a message to another illicit user. Without the use of geographical rendering, identification of that route as being illicit may be a relatively difficult endeavor. However, via the use of the illicit route viewing application 102, both source and destination locations may be displayed in an easy to view manner such that the relayed message may be resolved according to its actual source and/or designation addresses.

Information about illicit users 110 are stored in an illicit user database 128 while known illicit routes 112 are stored in the illicit route database 130. Information about the illicit users 110 and illicit routes 112 are generated by an illicit route determination engine 126 that is executed by an illicit route determination computing device 118. Generally, the illicit route determination engine 126 functions as a data mining tool to identify illicit users 110 from the routes 106 in the network 108. For example, the illicit route determination engine 126 may continually search through routes 106 generated in the network 108 at an ongoing basis to identify correlations among multiple routes 106 that may be indicative of an illicit activity. Using this information, the illicit route determination engine 126 may identify illicit users 110 that may have performed the illicit activity and store information about the illicit users 110 in the illicit user database 128, and store information about the illicit routes 112 in the illicit route database 130. Additionally details associated with the operation of the of illicit route determination engine 126 are described in U.S. patent application Ser. No. 14/683,964, filed Apr. 10, 2015, and entitled "Systems and Methods For Generating Network Threat Intelligence," the entire contents of which are incorporated by reference in its entirety.

The application 102 may use the illicit routes 112 stored in the illicit route database 130 and/or the illicit user information stored in the illicit user database 128 to filter the received routes 106 to only those associated with the illicit users 110 or any known illicit routes 112. By filtering all of the route information from the network, its size may be reduced to a manageable level. For example, in a typical usage scenario, over 1.5 Gigabytes-per-minute of route information may be generated by the network 108. As such, the application may filter, using known illicit routes and/or illicit users, the received route information to only that which is associated with the known illicit routes and/or illicit users, which can be in the range of 150 to 400 Megabytes-per-minute of route information, an amount of information that can be efficiently processed.

Figure 1B:
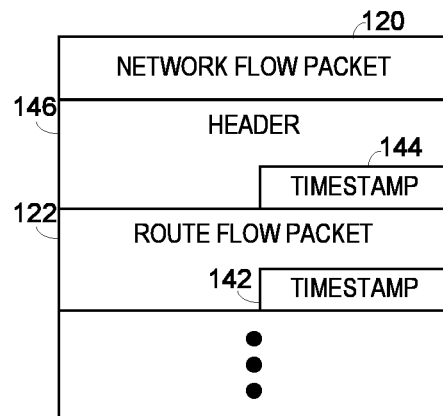
FIG. 1B illustrates an example network flow packet that may be used by the illicit route viewing system according to one embodiment of the present disclosure.

The route information may be received in any suitable manner. In one embodiment, the route information is received via network flow (Netflow) packets (e.g., version 5) 120 that each includes multiple route flow packets 122 representing individual routes 106 in the network 108. (See FIG. 1B). Use of the netflow packets for correlating route information with illicit users 110 or known illicit routes 112 may be beneficial in that the network flow packets 120 are natively adapted to generate a metadata form of information that is reduced in size, yet includes sufficient information sufficient for associating the route information with particular illicit users and/or geographical information associated with its source and/or destination location.

The network flow packets 120 are received through a tap 124 that may, among other things, intercept the network flow packets 120 that are being transmitted to the illicit route determination engine 126, which is configured to receive and process network flow packets 120 for illicit activity. The tap 124 may be referred to as a netflow exporter in that it generates the route flow packets 122 by accumulating information associated with one or more routes 106 over a specified period of time and transmits the generated route flow packets 122 to one or more intended recipients once the network flow packet 120 has been fully populated with related route information. For example, the illicit route viewer computing device 104 may be configured with the same address as the illicit route determination computing device 118 to spoof the tap 124 into sending an identical copy of network flow packets 120 to both the illicit route determination engine 126 and the application 102.

The illicit route viewer application 102 may perform several operations on the received network flow packets 120. In one embodiment, the illicit route viewer application 102 may filter the incoming network flow packets 120 according to whether their source address or destination address matches a known address of one of multiple illicit users 110. The illicit users 110 are computers used by people that have been determined to be those that perform some level of illicit activity by the illicit route determination engine 126. The illicit route determination engine 126 may be executed on one or more processors of an illicit route determination computing device 104 having one or memory units for storing the illicit route database 130 and the illicit user database 128.

In one embodiment, the illicit route viewer application 102 may filter those routes identified to be associated with at least one illicit user 110 according to one or more criteria, such as a type of malicious behavior (e.g., malware, viruses, spam, etc.), a geographic location of the source and/or destination address of the route 106, and/or the rate at which similar routes 106 are generated, such as a spam event in which numerous routes are generated in a short period of time (e.g., 1,000 routes generated within a 5 second window). Additionally, one or more of the criteria may be weighted according to a score for enhanced filtering. For example, the illicit users 110 may be weighted according to various criteria, such as a number of past offenses, the severity of past offenses, timer detected, type of activity detected, and/or the likelihood of any future offenses. The illicit route viewer application 102 may use a weighted score associated with each illicit user 110 to filter the incoming routes 106 to include the illicit users 110 having the greatest weighting score.

In one embodiment, the application 102 may maintain user accounts for the user computing devices 132 of individual users and allow access to information associated with certain illicit users or certain types of illicit users based upon access rights associated with each user account. That is, the application 102 may authorize a user to view the routes of a subset of the illicit users, and display the routes on one of multiple geographical displays according to the authorization. For example, the application 102 may establish a first user account for a first user in which that user is allowed to access those illicit users that may be associated with international drug trade, and establish a second user account for a second user in which that user is allowed to access the illicit routes having a source or destination address within a particular region (e.g., an enterprise boundary, a region of jurisdictional authority, etc.).

The route information may be provided to each user remotely using a secure socket 134 that is terminated at a user computing device 132 of each user. For example, the secure socket 134 may be configured with a relatively tight coupling to each user computing device 132 such that each secure socket 134 is restricted to operation only with the user computing device 132 it is to communicate with. The user computing device 132 includes at least one processor that executes instructions stored in a memory for performing various functions described herein, such as rendering the user interface 140 for displaying the routes at their corresponding geographical location on a map.

Once a user account is established, a login session for each user account may be generated using appropriate login credentials (e.g., user name/password). The login session provides for authentication of each user to mitigate the possibility for any illicit access to the routes 106 and/or type of routes 106 not authorized for use. A user account may use any suitable authentication mechanism. For example, the application 102 may communicate with the user computing device 132 to receive biometric scan data, such as fingerprint data obtained from a fingerprint scan device to authenticate the user for establishing the login session.

Once the routes 106 have been received and filtered by the illicit route viewer application 102, they may be displayed on a user interface (UI) 140, such as a liquid crystal display (LCD) or other similar type of display device within a graphical user interface (GUI). The user interface 140 may include a map 142, such as a map of the world or other suitable geographical region. The user interface 140 may include a zoom function. The route 106 may be displayed as a line, arc, or other graphical entity that indicates a link from a first location (e.g., source address of the route 106) to second location (e.g., destination address of the route 106).

As will be described in detail herein below, the illicit route viewer application 102 may display the routes 106 over an ongoing specified time interval, such as all the routes 106 that have been received and filtered over an ongoing 5 second interval. In another embodiment, the specified time interval may be modified by a user. For example, the user, via the user interface 140 may receive input for increasing or decreasing the specified time interval for providing enhanced for various different attack scenarios. Additionally, the illicit route viewer application 102 may display a time slider bar 142 on the user interface 140 that allows the user to view routes 106 that have occurred over a previous window of time, such as those routes 106 that have been received and filtered over the specified time interval at a previous time (e.g., 35 minutes ago).

Figure 1C:
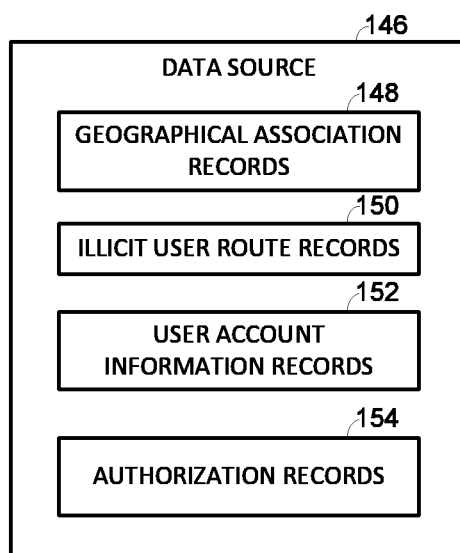
FIG. 1C illustrates an example data source that may be used by the illicit route viewing system according to one embodiment of the present disclosure.

The illicit route viewer computing device may also include a data source 146 for storage of information related to its operation. As best shown in FIG. 1C, the data source 146 stores geographical association records 148, illicit user route records 150, user account information records 152, and user authorization records 154. The geographical association records 148 includes information that associates source records and destination records with a particular geographical location, such as a city, a state, a country, and/or continent. When a route 106 is analyzed by the illicit route viewer application 102 it may compare the source address and/or destination address with the information stored in the geographical association records 148 to determine the route's source or destination to perform at least one of displaying the route on the user interface 140 and/or filtering the route 106 according to its geographical location, which may be an indicator of a malicious route 106.

The user account records 152 may be used to store information associated with user account information, such as login credential information (e.g., username/password combinations), secure socket/user computing device association information, and/or access rights. The access rights may be allocated to each user based upon his or her authorization level and/or upon any previously agreed upon contract negotiations. For example, the access rights may include what types of illicit users the user is allowed to view, specific illicit users that the user may be allowed to view, certain types of routes 106 that the user is allowed to view, a specific grouping of routes that the user is allowed to view, and the like. Additionally, the access rights may include certain performance characteristics to be maintained by the secure socket 134, such as certain throughput levels, time of day usage limitations, and/or priority of access to the route information relative to the other users of the system 100.

Figure 2A:
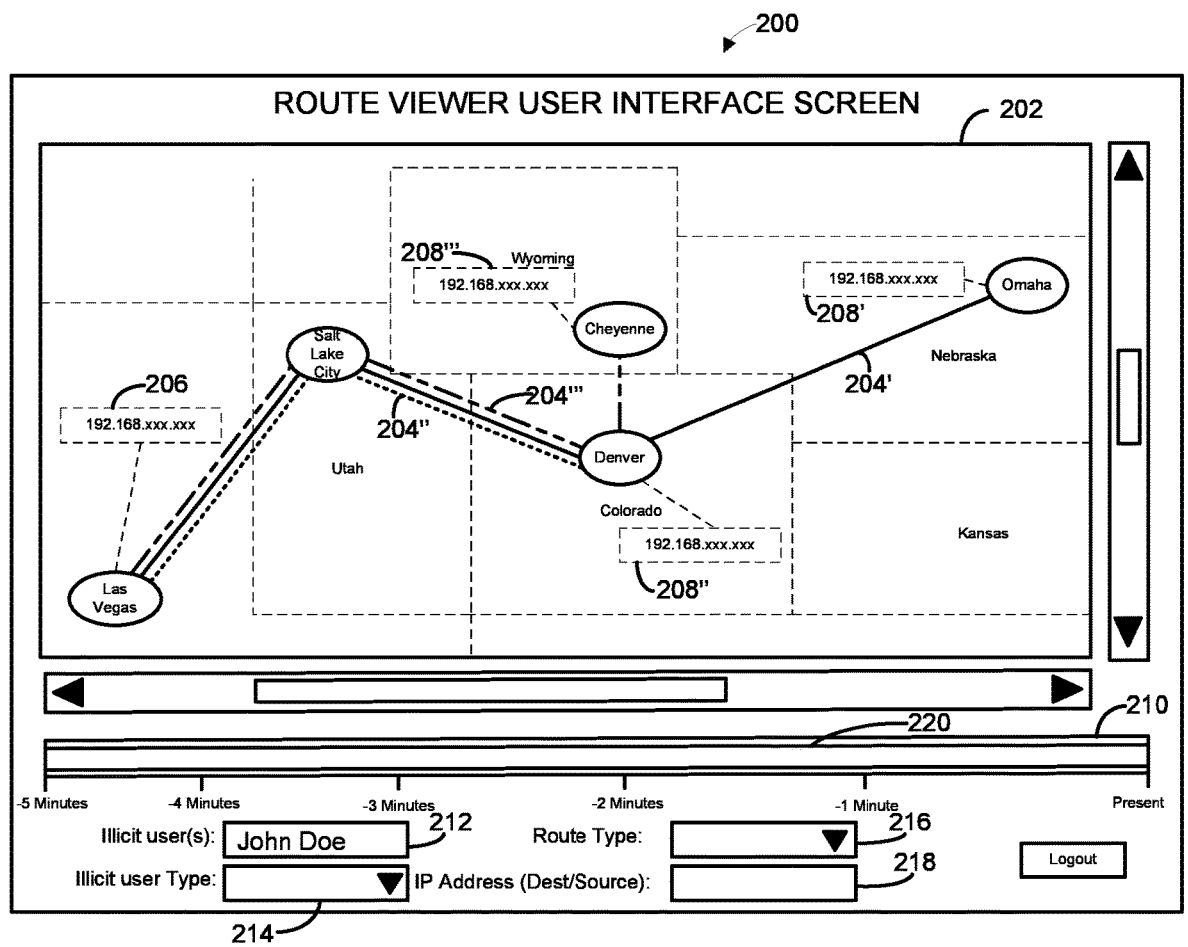
FIGS. 2A through 2C illustrate example route viewer user interface screens 200 that may be displayed by the illicit route viewer application according to one embodiment of the present disclosure.
Figure 2B:
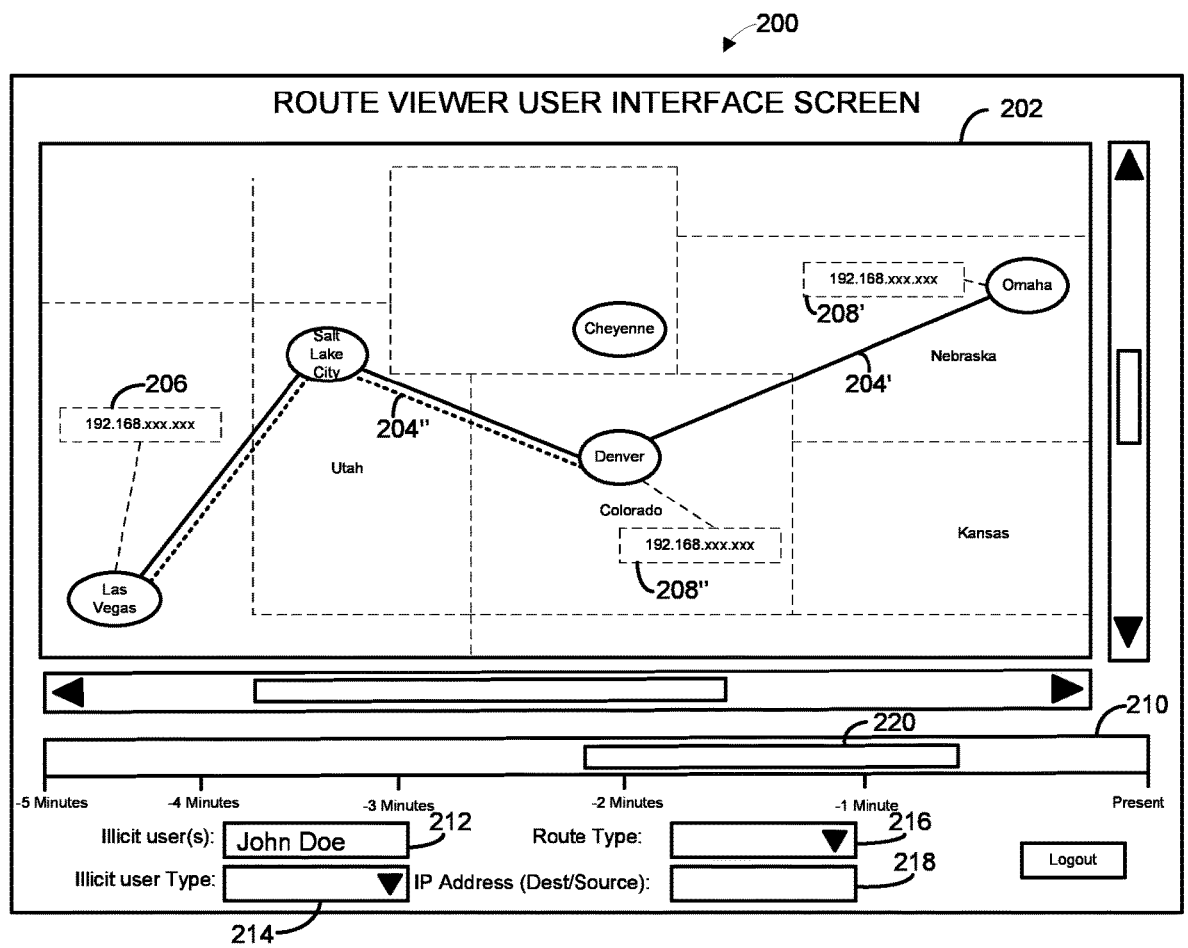
Figure 2C:
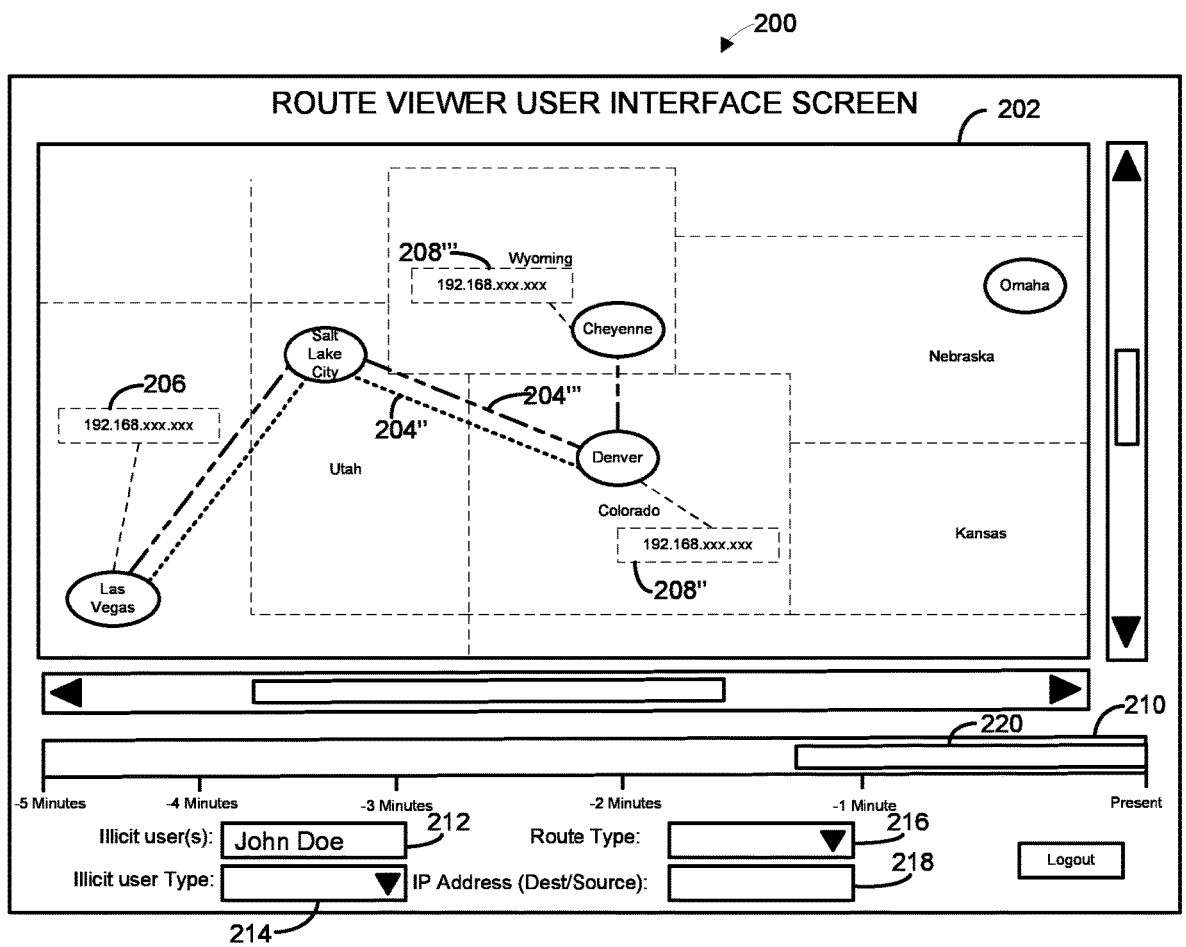

FIGS. 2A through 2C illustrate example route viewer user interface screens 200 that may be displayed by the application 102 according to one embodiment of the present disclosure. The route viewer user interface screens 200 may be displayed by a local display of the user computing device 132, one that is included as part of the route viewer computing device 104, or other suitable computing system in communication with the route viewer computing device 104. In general, the route viewer user interface screens 200 include a geographical display portion 202 for displaying a geographical map and one or more routes 204 with their source address 206 and destination address 208 positioned at locations corresponding to their geographical location on the map. The route viewer user interface screens 200 may also include a time window adjustment mechanism 210 and one or more user selectable fields for entry of user input for requesting certain illicit routes 106 for view by the user.

The user selectable fields include various entry fields that may be used to receive user input for generating a request to obtain certain routes from the illicit user records 136. Nevertheless, it should be understood that other user selectable fields may be implemented, fewer user selectable fields implemented, or other user selectable field implemented without departing from the spirit and scope of the present disclosure. As shown, the user selectable fields include an illicit user entry field 212 for entry of one or more illicit users, an illicit user type entry field 214 for entry of a type of illicit user, a route type entry field 216 for entry of a type of route to be viewed, and an address entry field 218 for entry of a particular address (e.g., source or destination) to be viewed.

The time window adjustment mechanism 210 has a slider bar 220 that can be manipulated by the user to adjust a time window that the application 102 uses to display those routes that have existed during that time window. The time window may be adjusted according to a duration of the time window and an amount of time from the present. Adjustment of the time duration may be adjusted by widening or shortening the slider bar 220, while the amount of time from the present may be adjusted by moving the slider bar 220 towards or away from the present time (e.g., far right edge of the time window adjustment mechanism).

As shown in FIG. 2A, the slider bar 220 has been expanded to cover the entire time window adjustment mechanism 210. Thus, three illicit routes 204', 204", and 204'" are displayed in which a first illicit route 204' has been detected with a source address 206 located at Las Vegas, Nevada and a destination address 208' located at Omaha, Nebraska that was detected at two minutes prior to the present time, a second illicit route 204" has been detected with a source address 206 located at Las Vegas, Nevada and a destination address 208" located at Denver, Colorado that was detected at approximately one minute to the present time, and a third illicit route 204'" has been detected with a source address located at Las Vegas, Nevada 206 and a destination address 208''' located at Cheyenne, Wyoming, which has been determined to have been originated by an illicit user named John Doe recently (e.g., close to the present time).

When the slider bar 220 has been adjusted to only the previous time extending from approximately 3 minutes prior to the present to approximately 2 minutes to the present as shown in FIG. 2B, only illicit routes 204' and 204'' are displayed. Moreover, when the slider bar 220 has been adjusted to only the previous time extending from approximately 2 minutes prior to the present to the present time as shown in FIG. 2C, only illicit routes 204'' and 204''' are displayed. Thus, the time window adjustment mechanism 210 may be used to see how the illicit user has manipulated the network 108 over various windows of time to provide increased granularity into the nature of illicit activity that may have occurred. As an additional note, the illicit user route records 136 include information associated with routes 106 that may be used for historical analysis, such as viewing routes 106 that have occurred at a previous time using a time slider bar 142.

Figure 3:
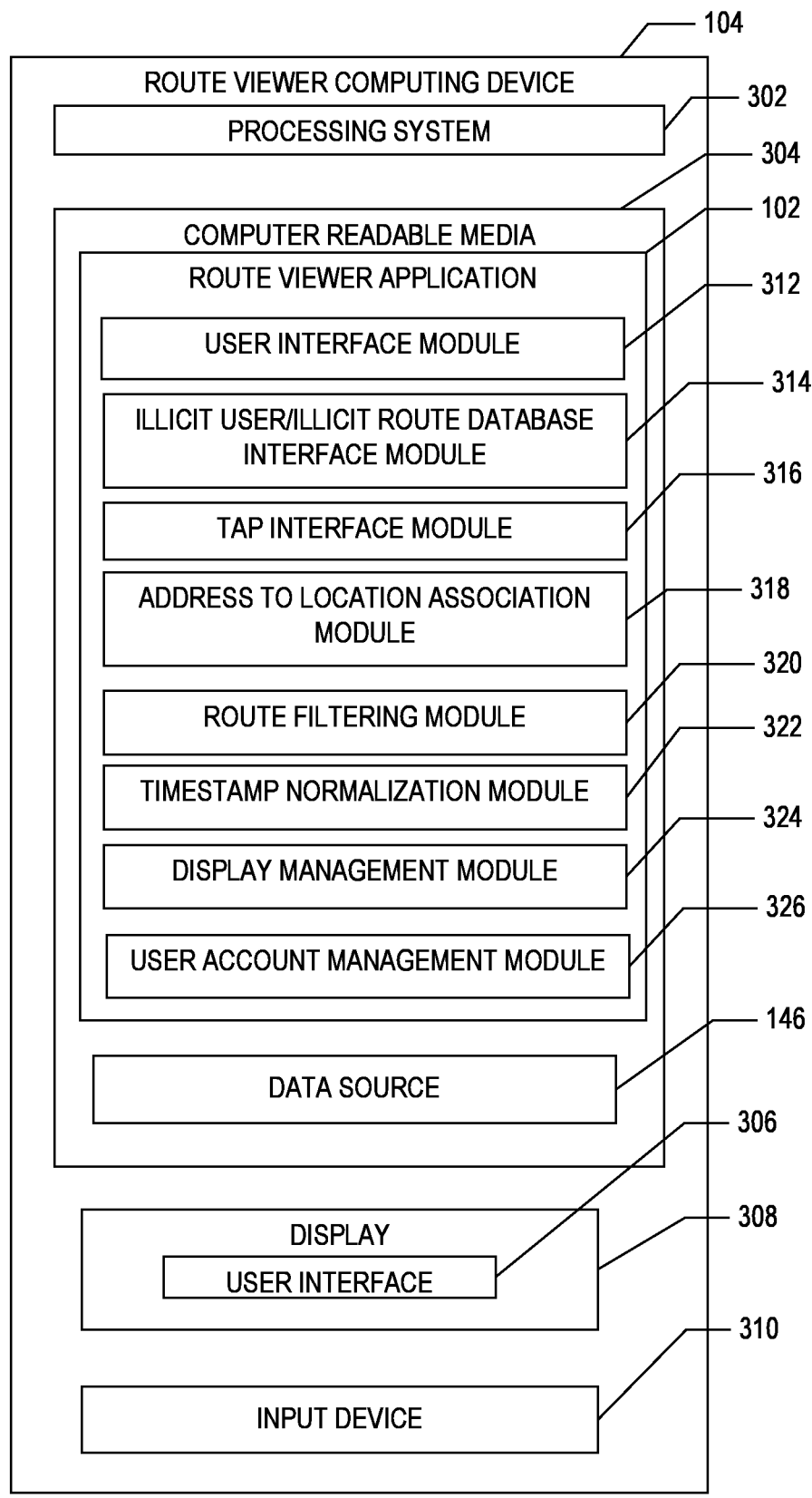
FIG. 3 is a block diagram depicting an example route viewer application executed on the route viewer computing device according to one embodiment of the present disclosure.

FIG. 3 is a block diagram depicting an example route viewer application 102 executed on the route viewer computing device 104. According to one aspect, the route viewer computing device 104 includes a processing system 302 that includes one or more processors or other processing devices. A processor is hardware. Examples of such a computing device may include one or more servers, personal computers, mobile computers and/or other mobile devices, and other computing devices. The route viewer computing device 104 may communicate with the tap 124, user computing device 132, and illicit route determination computing device 118 via wireless, wired, and/or optical communications.

According to one aspect, the route viewer computing device 104 includes a computer readable media 304 on which the route viewer application 102 and data source 146 are stored. The route viewer application 102 may include instructions and/or one or more modules that are executable by the processing system 302 to perform the features of the route viewing system 100 described herein.

The computer readable media 304 may include volatile media, nonvolatile media, removable media, non-removable media, and/or another available media that can be accessed by the illicit route viewer computing device 104. By way of example and not limitation, computer readable media 304 comprises computer storage media and communication media. Computer storage media includes non-transient storage memory/media, volatile media, nonvolatile media, removable media, and/or non-removable media implemented in a method or technology for storage of information, such as computer/machine readable/executable instructions, data structures, program modules, and/or other data. Communication media may embody computer readable instructions, data structures, program modules, or other data and include an information delivery media or system.

According to one aspect, the computing device 104 may include a user interface (UI) 306 displayed on a display 308, such as a computer monitor, for displaying data. In some cases, the GUI 306 may comprise the user interface 140 used to display the routes 106 on a geographical map as described herein. The computing device 104 may also include an input device 310, such as a keyboard or a pointing device (e.g., a mouse, trackball, pen, or touch screen) to enter data into or interact with the GUI 306. According to one aspect, the route viewer application 102 includes instructions or modules that are executable by the processing system 302 as will be described in detail herein below.

A user interface module 312 facilitates the receipt of input data and/or output data from or to a user, respectively, for manipulating the operation of the application 102. For example, the user interface module 312 may receive user input for manipulating or otherwise modifying how the routes 106 are displayed on the user interface 140, receiving user input for receiving user credentials for establishing a login session with the application 102, or other input for managing the operation of the application 102.

An illicit user database route database interface module 314 provides an interface to the illicit route determination computing device 118 for receiving information associated with any illicit users found by the illicit route determination engine 126 or types of routes used by the illicit users. In one embodiment, the illicit user database route database interface module 310 may be configured to establish a secure connection to the illicit route determination engine 126 for enhanced security. In other embodiments, the illicit user database route database interface module 310 may communicate with the illicit route determination engine 126 using other techniques, such as via middleware, or system calls if the illicit route determination engine 126 is local to the route viewer computing device 104.

A tap interface module 316 communicates with the tap 124 to receive route information associated with routes 106 in the network 108. In some cases, the tap interface module 316 may function as an interface between the tap 124 and the tap management module 316, which is described herein below, to perform various management functions associated with the operation of the tap 124, such as issuing instructions for manipulating the operation of the tap 124, receiving information about the status of the tap 124, and the like. In one embodiment, access to the tap 124 may be restricted to a login session for added security, such as one that may be provided to an administrator of the application 102.

An address to location association module 318 associates the source address and/or destination address with a geographical location where that source address and/or destination exists. For example, the address to location association module 318 may, upon receipt of an illicit route, identify the source and/or destination addresses of that illicit route and access the geographical association records 134 to obtain a geographical location where each of the source address and/or destination address is at. In one embodiment, the address to location association module 318 may include a discovery process that functions as a web crawler (e.g., spider) to periodically scan through certain regions (e.g., those regions or portions of the network that have been known to have a relatively high degree of illicit activity) of the network to update the geographical association records 134 for ongoing changes to addresses and their associated locations. For example, the address to location association module 318 may query the nodes (e.g., routers, switches, etc.) of certain addresses to obtain location about the nodes, and update or modify the geographical association records 134 at an ongoing basis such that a relatively accurate association between the addresses and geographical location are maintained.

A route filtering module 320 filters the route flow packets 122 according to one or more criteria, such as an illicit user 110 that may be associated with the source or destination address, a geographical location associated with the source and/or destination address, a rate at which similar route flow packets 122 have been received, and the like. Additionally, the illicit route viewer application 102 may filter the route flow packets 122 according to weighting scores associated with one or more of the criteria. For example, the route filtering module 320 may attach increased weighting scores to those illicit users having a relatively higher degree of previous offenses. As another example, the route filtering module 320 may attach increased weighting scores to certain geographical regions having a past history of ongoing illicit activity (e.g., the Russian Business Network, etc.).

A timestamp normalization module 322 normalizes a timestamp 142 of each route flow packet 122 with the timestamp 144 included in the network flow packet 120 by subtracting the timestamp 144 of the route 106 with that of the network flow packet 120. In many cases, the timestamp 142 of the route flow packet 122 itself may not be sufficiently accurate. Additionally, the timestamps 142 for each individual route flow packet 122 are generated by separate computing systems that often have their own clock, which is often not synchronized with one another. Thus, analysis of the network flow packet 120 may be relatively difficult to perform due to inconsistencies in when route information included in each route flow packet 122 is generated. However, by subtracting the timestamp 144 of the route 106 with that of the network flow packet 120, a relatively more accurate time may be determined. Embodiments of the application 102 that reference a timestamp 142 normalized to the timestamp 144 of the route 106 may provide enhanced accuracy over the timestamp 142 with no normalization to any reference source.

A display management module 324 manages the display of the user interface 140 for each user computing device 132 that accesses the application 102. For example, the display management module 324 may receive instructions from a first user computing device 132 to access certain illicit routes, perform one or more security functions to ensure that the request has been generated from a login session that has authorization to access those routes 106, and access those requested routes once authorization has been verified. The display management module 324 may also communicate with the address to location association module 318 to obtain geographical location information for the source address and destination address of each route included in the request, and include the obtained geographical information in the response to the request.

The display management module 324 may also provide an interface to one or more user computing devices 132 for receiving instructions associated with the operation of the application 102 for use on each user computing device 132 and/or for displaying illicit routes on the user interface 140 of each user computing device 132. In one embodiment, the display management module 324 may expose an application program interface (API) for each computing device 108 for establishing and maintaining a secure socket 134 between the route viewer computing device 104 and its respective user computing device 132. Additionally, the display management module 324 may include a firewall for limiting or otherwise governing the type of route information that is made available to each user computing device 132. For example, the display management module 324 may include one or more firewall directives that restrict or limit access to only those illicit user route records 150 that are allocated to access according to account information for each user.

a user account management module 326 manages the registration of new user accounts as well as manages the establishment and deletion of login sessions for use by each user computing device 132. For example, the user account management module 326 may receive a request to register an account with the application 102 and perform one or more functions to register the account, such as verifying the authenticity of the user desiring to register the account, determining an authorization level for the user account (e.g., what portion of the illicit routes that the user account may have access to), and/or the type and nature of security to be applied to the user account (e.g., the type of secure socket to be used for that user account, and any restrictions to how that secure socket may be accessed by the user computing device).

It should be appreciated that the modules described herein are provided only as an example of a computing device that may execute the route viewer application 102 according to the teachings of the present disclosure, and that other computing devices may have the same modules, different modules, additional modules, or fewer modules than those described herein. For example, one or more modules as described in FIG. 3 may be combined into a single module. As another example, certain modules described herein may be encoded and executed on other computing devices, such as the network element used by the user.

Figure 4:
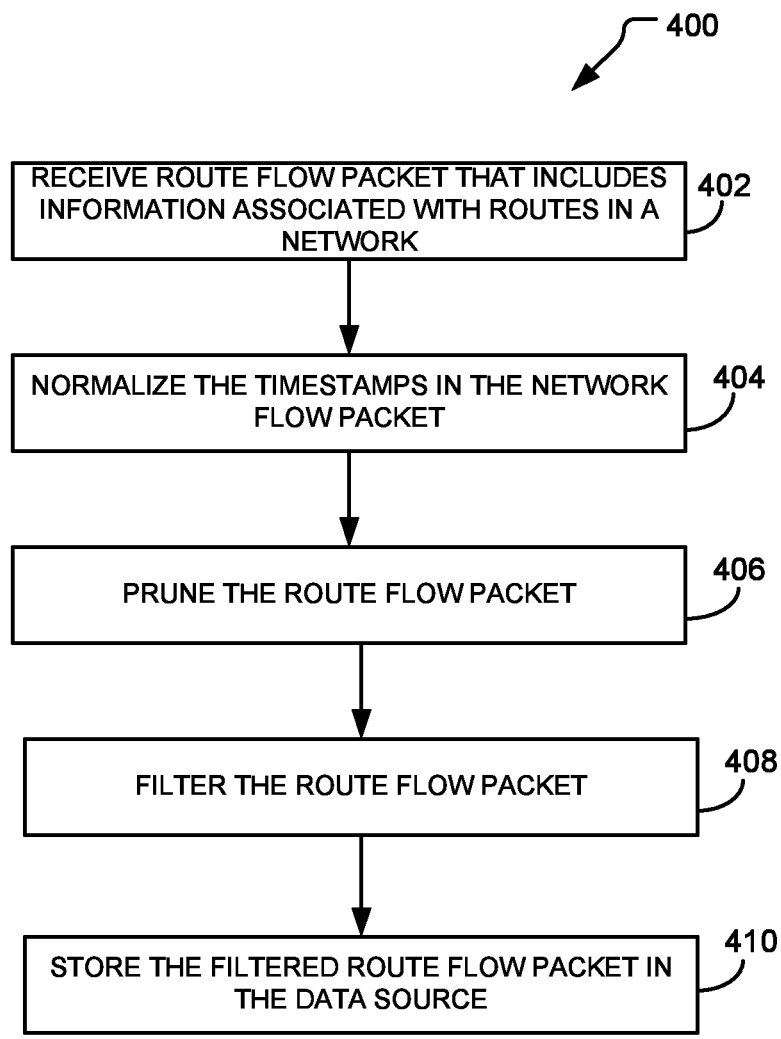
FIG. 4 illustrates an example method that may be performed by the illicit route viewer application to filter and store routes associated with illicit users according to one embodiment of the present disclosure.

FIG. 4 illustrates an example method that may be performed by the illicit route viewer application 102 to filter and store routes 106 associated with illicit users 110 according to one embodiment of the present disclosure.

In step 402, the illicit route viewer application 102 receives information associated with routes 106 in a network 108. For example, the routes 106 may be received as network flow packets 120 that have been copied using a tap 124 that spoofs the address of an illicit route database 130 so that the application 102 may receive a copy of those network flow packets that are sent to the illicit route determination engine 126.

In step 404, the illicit route viewer application 102 normalizes the timestamps in the network flow packet. Both the network flow packet 120 and route flow packets 122 included in the network flow packet 120 include a timestamp. However, in many cases, the timestamps are not sufficiently synchronized with one another. Thus, the timestamp 144 of the route 106 may be subtracted from the timestamp of the network flow packet 120 so that the timestamps may be normalized with one another. Additionally, the illicit route viewer application 102 may prune the received route flow packet 122 to include only those elements that may be important for viewing in step 406. For example, the illicit route viewer application 102 may prune extraneous elements of the route flow packet 122, such as a packet size indicator, a packet identity, and the like.

In step 408, the illicit route viewer application 102 filters the route flow packet 122 according to one or more criteria, such as an illicit user 110 that may be associated with the source or destination address, a geographical location associated with the source and/or destination address, a rate at which similar route flow packets 122 have been received, and the like. Additionally, the illicit route viewer application 102 may filter the route flow packets 122 according to weighting scores associated with one or more of the criteria. Thereafter, the illicit route viewer application 102 stores the illicit user route as illicit user route records 136 in the data source 132 for use at a later time in step 410.

The process described above may be repeatedly performed for additional routes 106 observed by the system 100. Nevertheless, when use of the application 102 is no longer needed or desired, the process ends.

Figure 5:
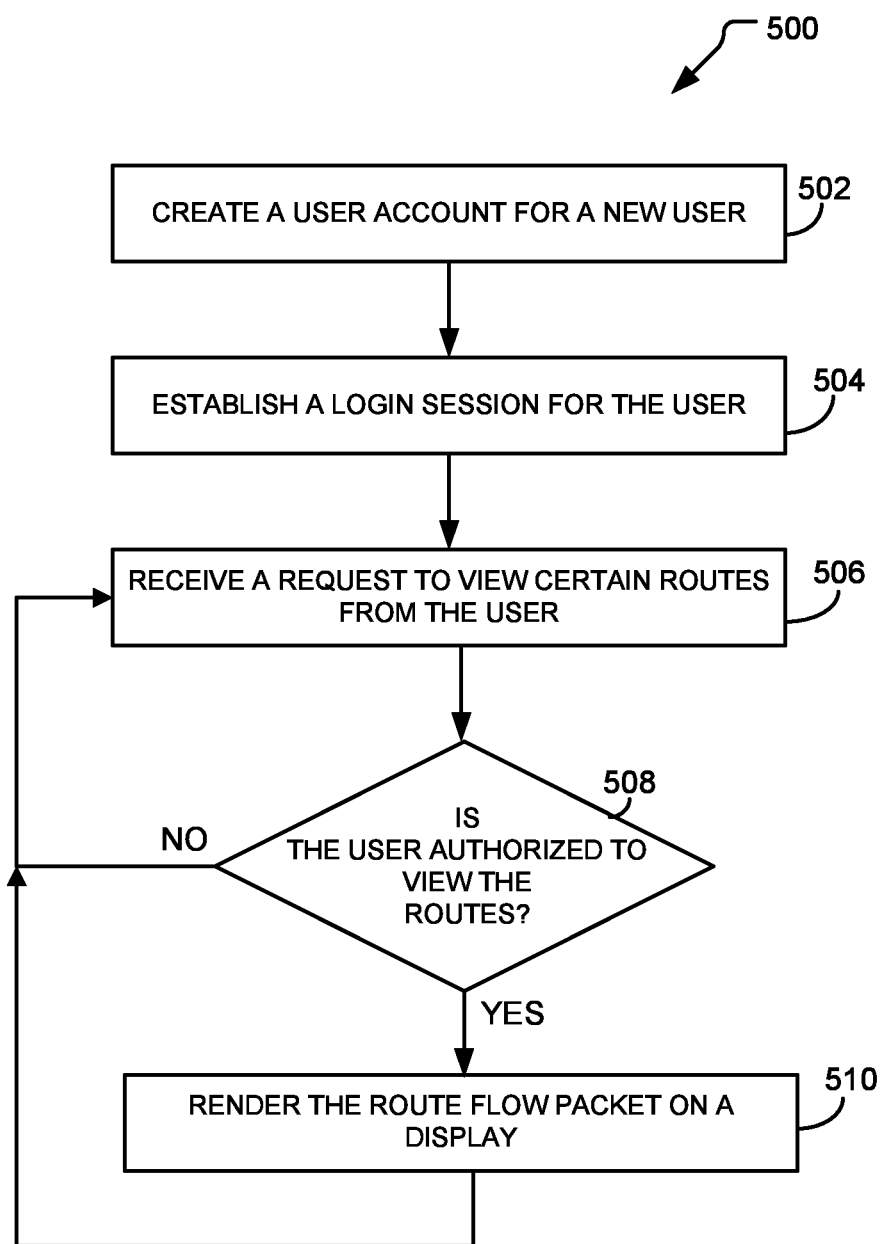
FIG. 5 illustrates an example process that may be performed to receive request for viewing the stored routes and rendering the routes on the user computing device according to one embodiment of the present disclosure.

FIG. 5 illustrates an example process 500 that may be performed to receive request for viewing the stored routes and rendering the routes on the user computing device according to one embodiment of the present disclosure.

In step 502, a user account is created for a user by the application 102. For example, the application 102 many receive user information such as name, mailing address, phone number along with other information that may be used for identification purposes, verify the authenticity of the information, and create a user account for use by the user. In one embodiment, the user account may include authorization information associated with what type of routes that the user is allowed to view.

After the user account is created, the application 102 may establish a login session using the user account in step 504. Using the login session, the application 102 may receive a request to view certain routes stored in the our 136 in step 506. Upon receive of the request, the application 102 verifies that the requested routes are authorized for view by the user of the user account. For example, the user may only be authorized to view the routes associated with certain illicit users 110, or view certain types of routes, or view only those routes that originate in or are terminated in a certain geographical region.

In step 510, the application 102 determines whether the routes are to be allowed for view. If so, processing continues at step 512; otherwise processing continues at step 506 to receive another request for viewing other routes 112 stored in the illicit route database 130.

In step 512, the illicit route viewer application 102 renders the route 106 on the display 138 according to a geographical location associated with the route's source and destination addresses. In one embodiment, the illicit route viewer application 102 may color code each displayed route 106 according to one or more of the criteria. For example, the illicit route viewer application 102 may render a first route 106 that is associated with spam with a first color (e.g., red), while rendering a second route 106 that is associated with malware to be a second color (e.g., green). The displayed route may also include a directional indicia (e.g., an arrow, etc.) indicating which direction to route originated from and its destination.

Although FIGS. 4 and 5 describe several examples of a process that may be performed by the illicit route viewer application 102, the features of the disclosed process may be embodied in other specific forms without deviating from the spirit and scope of the present disclosure. For example, the illicit route viewer application 102 may perform additional, fewer, or different operations than those operations as described in the present example processes.

FIG. 6 illustrates an example computing system 600 that may implement various systems, such as the control circuit 118, and methods discussed herein, such as process 600. A general purpose computer system 600 is capable of executing a computer program product to execute a computer process. Data and program files may be input to the computer system 600, which reads the files and executes the programs therein such as the application 504. Some of the elements of a general purpose computer system 600 are shown in FIG. 6 wherein a processing system 602 is shown having an input/output (I/O) section 604, a hardware central processing unit (CPU) 606, and a memory section 608. The processing system 602 of the computer system 600 may have a single hardware central-processing unit 606 or a plurality of hardware processing units. The computer system 600 may be a conventional computer, a server, a distributed computer, or any other type of computing device, such as one or more external computers made available via a cloud computing architecture. The presently described technology is optionally implemented in software devices loaded in memory 608, stored on a configured DVD/CD-ROM 610 or storage unit 612, and/or communicated via a wired or wireless network link 614, thereby transforming the computer system 600 in FIG. 6 to a special purpose machine for implementing the described operations.

The memory section 608 may be volatile media, nonvolatile media, removable media, non-removable media, and/or other hardware media or hardware mediums that can be accessed by a general purpose or special purpose computing device. For example, the memory section 608 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable instructions, data structures, program modules, algorithms, and/or other data. The communication media may also include a non-transitory information delivery technology. The communication media may include wired and/or wireless connections and technologies and be used to transmit and/or receive wired and/or wireless communications.

The I/O section 604 is connected to one or more optional user-interface devices (e.g., a user interface such as a keyboard 616 or the user interface 512), an optional disc storage unit 612, an optional display 618, and an optional disc drive unit 620. Generally, the disc drive unit 620 is a DVD/CD-ROM drive unit capable of reading the DVD/CD-ROM medium 610, which typically contains programs and data 622. Computer program products containing mechanisms to effectuate the systems and methods in accordance with the presently described technology may reside in the memory section 608, on a disc storage unit 612, on the DVD/CD-ROM medium 610 of the computer system 600, or on external storage devices made available via a cloud computing architecture with such computer program products, including one or more database management products, web server products, application server products, and/or other additional software components. Alternatively, a disc drive unit 620 may be replaced or supplemented by a floppy drive unit, a tape drive unit, or other storage medium drive unit. An optional network adapter 624 is capable of connecting the computer system 600 to a network via the network link 614, through which the computer system can receive instructions and data. Examples of such systems include personal computers, Intel or PowerPC-based computing systems, AMD-based computing systems, ARM-based computing systems, and other systems running a Windows-based, a UNIX-based, a mobile operating system, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 600 is connected (by wired connection and/or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are examples of communications devices for and other means of establishing a communications link between the computers may be used.

In an example implementation, source code executed by the control circuit 118, a plurality of internal and external databases optionally are stored in memory of the control circuit 118 or other storage systems, such as the disk storage unit 612 or the DVD/CD-ROM medium 610, and/or other external storage devices made available and accessible via a network architecture. The source code executed by the control circuit 118 may be embodied by instructions stored on such storage systems and executed by the processing system 602.

Some or all of the operations described herein may be performed by the processing system 602, which is hardware. Further, local computing systems, remote data sources and/or services, and other associated logic represent firmware, hardware, and/or software configured to control operations the system 100 and/or other components. The system set forth in FIG. 6 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed:

1. A route viewing system comprising:
 a computing system in communication with a network service computing device and comprising at least one memory for storing instructions that are executed by at least one processor to:
  receive information associated with one or more routes through a network;
  identify the routes that are associated with at least one illicit user computer;
  obtain a source location of a source address of the routes and a destination location of a destination address of the routes;
  filter the identified routes according to one or more weighting values; and
  display the filtered routes on a geographical display at the source location of the source address and the destination location of the destination address of each of the routes.

2. The system of claim 1, wherein the instructions are further executed to display each of the routes with an indicium based upon a specified type of the route.

3. The system of claim 1, wherein the instructions are further executed to obtain the source location of the source address and the destination location of the destination address by obtaining latitude and longitude information associated with the source address and the destination address stored in the at least one memory.

4. The system of claim 1, wherein the one or more weighting values are associated with one or more characteristics of the route.

5. The system of claim 4, wherein the characteristics of the route include at least one of a type of malicious behavior associated with the route, the illicit user associated with the route, and a geographical region associated with the route.

6. The system of claim 1, wherein the instructions are further executed to display the routes that have existed during a time window comprising a range of time in the past.

7. The system of claim 6, wherein the instructions are further executed to receive user input for modifying a duration of the time window and an amount of time from the present.

8. The system of claim 1, wherein the instructions are further executed to:
 identify the routes that are associated with each of a plurality of illicit user computers used by a corresponding plurality of illicit users;
 authorize a user to view the routes of a subset of the illicit users; and
 display the routes on one of a plurality of geographical displays according to the authorization.

9. The system of claim 1, wherein the instructions are further executed to receive information associated with routes using network flow packets obtained from a tap, the tap comprising a netflow exporter.

10. A route viewing method comprising:
receiving, using instructions stored in at least one memory and executed by at least one processor, information associated with one or more routes through a network;
identifying, using the instructions, the routes that are associated with at least one illicit user computer;
obtaining, using the instructions, a source location of a source address of the routes and a destination location of a destination address of the routes;
filtering, using the instructions, the identified routes according to one or more weighting values; and
displaying, using the instructions, the filtered routes on a geographical display at the source location of the source address and the destination location of the destination address of each of the routes.

11. The method of claim 10, further comprising displaying each of the routes with an indicium based upon a specified type of the route.

12. The method of claim 10, further comprising obtaining the source location of the source address and the destination location of the destination address by obtaining latitude and longitude information associated with the source address and the destination address stored in the at least one memory.

13. The method of claim 10, wherein the one or more weighting values are associated with one or more characteristics of the route.

14. The method of claim 13, wherein the characteristics of the route include at least one of a type of malicious behavior associated with the route, the illicit user associated with the route, and a geographical region associated with the route.

15. The method of claim 10, further comprising displaying the routes that have existed during a time window comprising a range of time in the past.

16. The method of claim 15, further comprising receiving user input for modifying a duration of the time window and an amount of time from the present.

17. The method of claim 10, further comprising:
identifying the routes that are associated with each of a plurality of illicit user computers used by a corresponding plurality of illicit users;
authorizing a user to view the routes of a subset of the illicit users; and
displaying the routes on one of a plurality of geographical displays according to the authorization.

18. The method of claim 10, further comprising receiving information associated with routes using network flow packets obtained from a tap, the tap comprising a netflow exporter.

19. Code implemented in a non-transitory, computer readable medium that when executed by at least one processor, is operable to perform at least the following:
receiving information associated with one or more routes through a network;
identifying the routes that are associated with at least one illicit user computer used by an illicit user;
obtaining a source location of a source address of the routes and a destination location of a destination address of the routes;
filtering the identified routes according to one or more weighting values; and
displaying the filtered routes on a geographical display at the source location of the source address and the destination location of the destination address of each of the routes.

20. The code of claim 19, further operable to perform obtaining the source location of the source address and the destination location of the destination address by obtaining latitude and longitude information associated with the source address and the destination address stored in the at least one memory.

* * * * *